United States Patent
Booij

(10) Patent No.: US 11,380,453 B2
(45) Date of Patent: Jul. 5, 2022

(54) CHROMATOGRAPHIC SEPARATION OF MO-99 FROM W-187

(71) Applicant: Curium US LLC, St. Louis, MO (US)

(72) Inventor: Arend Booij, Anna Paulowna (NL)

(73) Assignee: Curium US LLC, St. Louis, MO (US)

( * ) Notice: Subject to any disclaimer, the term of this patent is extended or adjusted under 35 U.S.C. 154(b) by 814 days.

(21) Appl. No.: 16/325,245

(22) PCT Filed: Aug. 14, 2017

(86) PCT No.: PCT/US2017/046716
§ 371 (c)(1),
(2) Date: Feb. 13, 2019

(87) PCT Pub. No.: WO2018/035020
PCT Pub. Date: Feb. 22, 2018

(65) Prior Publication Data
US 2019/0206584 A1 Jul. 4, 2019

Related U.S. Application Data

(60) Provisional application No. 62/375,690, filed on Aug. 16, 2016.

(51) Int. Cl.
| | |
|---|---|
| *C01G 1/00* | (2006.01) |
| *G21G 1/00* | (2006.01) |
| *B01D 15/00* | (2006.01) |
| *C22B 34/30* | (2006.01) |
| *C22B 3/24* | (2006.01) |
| *B01D 15/38* | (2006.01) |

(52) U.S. Cl.
CPC ............ *G21G 1/001* (2013.01); *B01D 15/00* (2013.01); *B01D 15/3828* (2013.01); *C22B 3/24* (2013.01); *C22B 34/30* (2013.01); *B01D 2257/60* (2013.01); *G21G 2001/0036* (2013.01); *G21G 2001/0094* (2013.01)

(58) Field of Classification Search
CPC ............ G21G 1/001; G21G 2001/001; G21G 2001/0036; G21G 2001/0094; C22B 34/30; C22B 3/24; B01D 15/00; B01D 15/3828
See application file for complete search history.

(56) References Cited

U.S. PATENT DOCUMENTS

2009/0277828 A1   11/2009   Lee et al.

FOREIGN PATENT DOCUMENTS

| WO | 2011134672 A1 | 11/2011 |
| WO | 2012018752 A1 | 2/2012 |

OTHER PUBLICATIONS

International Search Report and Written Opinion of the International Searching Authority regarding PCT/US2017/046716 dated Nov. 30, 2017; pp. 1-13.
Pourmand, Ali et al., Distribution coefficients of 60 elements on TODGA resin: Application to Ca, Lu Hf, U and Th isotope geochemistry, ScienceDirect, 2010, pp. 741-753, Taianta 91, Elsevier B V.
Mullins, W.T et al., The Radiochemistry of Tungsten, National Academy of Sciences, Sep. 1961, pp. 1-46.
Zhang, Anyun et al., Adsorption and Chromatographic Separation of Mo(VI) and Zr(IV) Ions from a High-concenlialion Oxalic Acid Solution by a Macroporous Silica-based N,N,N',N'-Tetraoctyl-3-Oxapentance-1,4-Diamide Polymeric Absorbent, Adsorption Science & Technology, 2004, pp. 497-510, vol. 22, No. 6.
Liu, Chuen-Ying, et al., Separation and Concentration of Molybdenum(VI) and Tungsten(VI) with Chelating Ion-Exchange Resins Containing Sulphur Ligands, Taianta, 1984, pp. 353-356, vol. 31, No. 5, Pergamon Press Ltd.

*Primary Examiner* — Steven J Bos
(74) *Attorney, Agent, or Firm* — Armstrong Teasdale LLP

(57) ABSTRACT

The present disclosure provides a method of separating Mo-99 from W-187 from a solution comprising Mo-99 and W-187. The method comprises contacting a tridentate diglycolanude ligand with a solution comprising Mo-99 and W-187 and eluting W-187 from the tridentate diglycolanude ligand to thereby an eluate comprising W-187.

19 Claims, 1 Drawing Sheet

CHROMATOGRAPHIC SEPARATION OF MO-99 FROM W-187

CROSS-REFERENCE TO RELATED APPLICATIONS

This application is a National Stage application of International Application No. PCT/US2017/046716, filed on Aug. 14, 2017. International Application No. PCT/US2017/046716 claims priority to U.S. Provisional patent application Ser. No. 62/375,690 filed Aug. 16, 2016, the entire disclosure of which is hereby incorporated by reference as if set forth its entirety.

FIELD OF THE INVENTION

The field of the invention relates generally to a method for the chromatographic separation of radioactive ions, and more specifically to the chromatographic separation of Mo-99 from W-187.

BACKGROUND OF THE INVENTION

Molybdenum-99 (Mo-99) is produced commercially by intense neutron-bombardment of a highly purified uranium-235 target (High Enriched Uranium (HEU) target), followed rapidly by extraction. It is used as a parent radioisotope in technetium-99m generators to produce the even shorter-lived daughter isotope technetium-99m, which is used in many medical procedures. The new Low Enriched Uranium (LEU) target concept is based on the current High Enriched Uranium (HEU) target. Converting the target from HEU to LEU means that the percentage of U-235, which is the fissile material that produces molybdenum-99, decreases from around 95% to 20%. Therefore, a larger mass of uranium must be added (at least 4 times as much) in the LEU target to obtain the same amount of U-235 per target. Tungsten was not of concern until the use of LEU caused the need for more targets to be processed at a time, and hence, tungsten contamination was detected in the final product. The source of the stable tungsten is likely to be the oven tip, where the uranium-aluminum alloy targets are heated during their production. This is further complicated during the target bombardment, as the natural tungsten can be activated to tungsten-187 by the neutron flux. Tungsten belongs to the same chemical group as molybdenum; therefore they are chemically similar. As a consequence, tungsten (all isotopes) are present in the final molybdenum-99 product.

Tungsten-187 (W-187) emits over twenty different photon energies. The three most intense energies are: 685.72(100) ±0.04 keV, 479.51(80.47)±0.03 keV and 134.24(29.4)±0.03 keV. Tungsten-187, with a 23.9 hour half-life, decays to stable rhenium-187. Rhenium behaves chemically in a similar way as technetium and will elute together with it from the alumina generator column. In the normal situation, both molybdenum and tungsten will remain on the column and will not be injected into the patients.

Despite the low risk imposed by a tungsten impurity, the Mo-99 product should comply with the product specifications, which requires an activity below 0.1 kBq/MBq Mo-99 for all other gamma emitters (excluding $^{99m}$Tc) between time of first use and expiry. At the end of production, the concentration of Mo-99 is 370 MBq Mo-99/mL. Therefore, the W-187 impurity cannot exceed 37 KBq W-187/mL. The time of analysis is approximately 10 hours after production. Approximately 10 hours after the end of production, tungsten-187 in the analysis sample has a radioactivity concentration of 48 kBq W-187/mL. The time of first use is approximately 24 hours after production. Because of the short half-life of W-187 (~24 hr), the activity of W-187 must be considered at the time of first use. Eight days after production, the maximum activity of non-specified γ-emitters (including W-187) is 0.1 KBq/mL Mo-99.

However, due to the high activity of molybdenum-99 in the analysis sample, it could be difficult to distinguish the 7634 times (10 hr after production) smaller activity of tungsten-187 in the event of out of specification level. Therefore, a method to separate the molybdenum and W-187 is necessary. Since the impurities have to be quantified and detected at such low levels compared to the total activity of Mo-99, it becomes necessary to build an accurate, sensitive, safe and robust tungsten-187 (QC) analytical method.

BRIEF DESCRIPTION OF THE INVENTION

Briefly, the present invention is directed to a method of separating Mo-99 from W-187 from a solution comprising Mo-99 and W-187, the method comprising: contacting a tridentate diglycolamide ligand with a solution comprising Mo-99 and W-187; and eluting the W-187 from the tridentate diglycolamide ligand to thereby yield an eluate comprising W-187.

DETAILED DESCRIPTION OF THE EMBODIMENT(S) OF THE INVENTION

Figure 1:
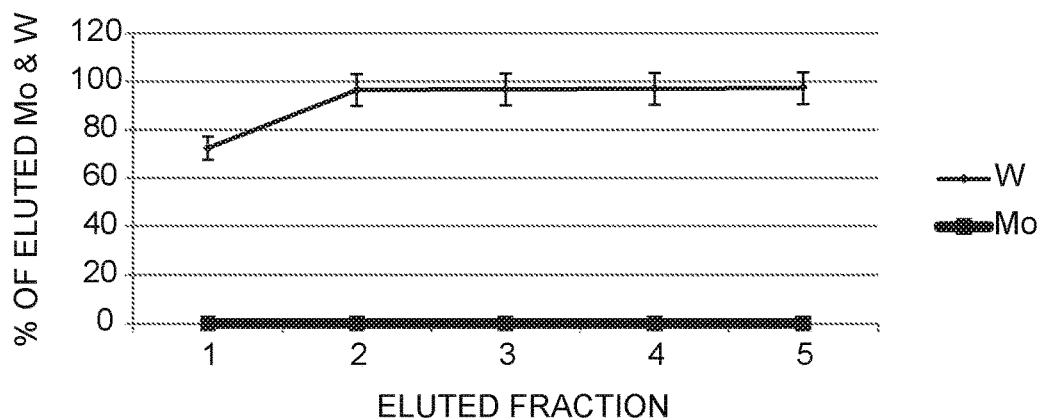
FIG. 1 is a graph demonstrating the separation of W and Mo according to some embodiments of the present invention. The eluting solution comprises 3 M HCl.

The present invention is directed to a method of separating Mo-99 from W-187 from a solution comprising Mo-99 and W-187. In some embodiments, the method comprises contacting a tridentate diglycolamide ligand with a solution comprising Mo-99 and W-187 and eluting the W-187 from the tridentate diglycolamide ligand to thereby yield an eluate comprising W-187. The eluted fraction may be analyzed by ICP-AES and/or by Gamma Spectrometry. The method of the present invention achieves a high separation factor and recovery of the tungsten fraction to make a sensitive Gamma Spectrometric assay on the tungsten-187, with a minimal interference from Mo-99 γ-emission.

In some embodiments, the ion-exchange material comprises a tridentate diglycolamide ligand. In some preferred embodiments, the ion-exchange material TODGA provided excellent results for the separation of molybdate and tungstate. According to the some embodiments, less than about 0.02% of molybdate and 70%±5% of tungstate was eluted in the first fraction when using a mobile phase comprising between about 3.0 and about 4.0 M of hydrochloric acid.

In some embodiments, the ion exchange material comprises a tridentate diglycolamide ligand. In some embodiments, the tridentate diglycolamide ligand has the following general structure:

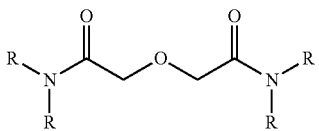

Wherein each R is independently a $C_1$ to $C_{12}$ alkyl, preferably a $C_4$ to $C_{12}$ alkyl, such as a $C_6$ to $C_{10}$ alkyl, or a $C_8$ alkyl. The alkyl groups may be branched or they may be straight-changed In some embodiments, the tridentate diglycolamide ligand comprises N,N,N',N'-tetraoctyldiglycolamide. N,N,N',N'-tetraoctyldiglycolamide (herein also TODGA) has the following structure:

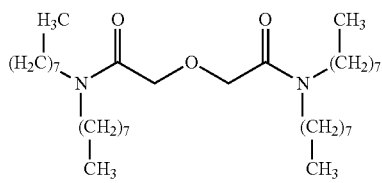

TODGA resin is available commercially. TODGA resin suitable for the separation method of the present invention may be contained with a chromatography column or a chromatography cartridge. In some embodiments, the TODGA resin may be pre-packed into a 2 mL capacity cartridge containing the resin in particle sizes between about 20 micrometers and 200 micrometers, such as between 50 micrometers and 100 micrometers.

In some embodiments, the loading solution comprises Mo-99. Generally, the Mo-99 is present within the solution as a molybdate salt. Molybdate species include $MoO_4^{2-}$, $Mo_2O_7^{2-}$, $Mo_3O_{10}^{2-}$, $Mo_4O_{13}^{2-}$, $Mo_5O_{16}^{2-}$, $Mo_6O_{19}^{2-}$, $Mo_7O_{24}^{2-}$, $Mo_8O_{26}^{2-}$, and the like. A variety of molybdate species comprising Mo-99 may be present at the acidity of the loading solution. Additionally, various other molybdenum species (i.e., Mo species that are not Mo-99) may also be present in the solution.

In some embodiments, the loading solution comprises W-187. Generally, the W-187 is present within the solution as a tungstate salt. Tungstate species include $WO_4^{2-}$, $HWO_4^-$, $W_2O_7^{2-}$, $W_7O_{24}^{6-}$, $W_{10}O_{32}^{4-}$, $[H_2W_{12}O_{42}]^{10-}$, $[H_2W_{12}O_{40}]^{6-}$, and the like. A variety of tungstate species comprising W-187 may be present at the acidity of the loading solution. Additionally, various other tungsten species (i.e., W species that are not W-187) may also be present in the solution.

Due to the conditions of the HEU and LEU generators, the activity ratio of W-187/Mo-99 in the loading solution may vary between about 500 kBq and about 18 KBq W-187 activity to about 370 MBq of Mo-99 activity, wherein Bq is one Becquerel, which is the activity of a quantity of radioactive material in which one nucleus decays per second.

The separation of the W-187 species from the Mo-99 species is facilitated by the presence of an acid in the loading solution. Accordingly, the loading solution may additionally comprise an acid. Suitable acids may be selected from among hydrochloric acid, nitric acid, sulfuric acid, and any combination thereof. Preferably, the acid concentration in the loading solution is at least about 2.0 M, or at least about 2.5 M, or at least about 3.0 M, or at least about 3.5 M, or such as between about 2.5 M and about 4.0 M, or between about 3.0 M and about 4.0 M, such as about 3.0 M, about 3.5 M, or about 4.0M. At an acid concentration (hydrochloric acid) of about 3.0 M, the distribution coefficient, $K_d$, of Mo for TODGA resin is on the order of about $10^3$, while the distribution coefficient, $K_d$, of W for TODGA resin is on the order of less than about $10^1$. The distribution coefficient is defined according to the following equation:

$$\text{Distribution coefficient } (K_d) = \frac{C_{solid} \text{ per gram } TODGA}{C_{solution} \text{ per mL solution}}$$

Since the distribution coefficient of Mo is so much higher than W at a hydrochloric acid concentration of about 3.0 M, the Mo species, e.g., Mo-99, is substantially retained in the chromatographic column or cartridge, while the W species, e.g., W-187, is substantially eluted from the column or cartridge by the application of a mobile phase.

In order to carry out the method of the present invention, the loading solution comprising the Mo-99 species, the W-187 species, and the acid is loaded onto the ion exchange resin, which may be contained within a chromatography column or chromatography cartridge. The elution is carried out with a mobile phase comprising an aqueous acidic solution. Preferably, the mobile phase acid concentration is substantially the same acid concentration as the acid concentration in the loading solution. Still further, the mobile phase acid is preferably the same acid or mix of acids present in the loading solution. Since the loading solution may comprise various products of an HEU or LEU generator, the acid concentration may vary. In any event, the loading phase is usually acidified with a known concentration of acid that is substantially higher than the acidity of the reactor product, and the mobile phase comprises the same known concentration of acid. Accordingly, the mobile phase solution preferably comprises an acid selected from among hydrochloric acid, nitric acid, sulfuric acid, and any combination thereof. Preferably, the acid concentration in the mobile phase solution is at least about 2.0 M, or at least about 2.5 M, or at least about 3.0 M, or at least about 3.5 M, or such as between about 2.5 M and about 4.0 M, or between about 3.0 M and about 4.0 M, such as about 3.0 M, about 3.5 M, or about 4.0M.

The mobile phase may be drawn through the chromatography column or cartridge by gravity or by applying vacuum. The eluate solution may be collected in vials of a standardized volume throughout the elution, e.g., at least about 1 mL collected in each vial, or at least about 2 mL collected in each vial, or about 5 mL collected in each vial. Due to the substantially high distribution coefficient, $K_d$, of Mo for TODGA resin, the Mo-99 species is substantially retained in the TODGA resin. Further, due to the significantly lower distribution coefficient, $K_d$, of W for TODGA resin, the W-187 species is collected in the first fractions. The fractions are analyzed by a suitable analytical technique to measure the relative activity of W-187 and Mo-99 in the eluted fractions. A suitable technique is inductively coupled plasma mass spectrometry detected by atomic emission spectroscopy (ICP-AES). Another suitable method is Gamma Spectrometry. According to the method of the present invention, at least about 99% of Mo-99 is removed from the loading solution, or at least about 99.5% of Mo-99 is removed from the loading solution, or at least about 99.9% of Mo-99 is removed from the loading solution, or at least about 99.99% of Mo-99 is removed from the loading solution. In some specific embodiments, about 70% of the W-187 content is collected in the first eluate fraction (5 mL).

According to the method of the present invention, the yield of W-187 collected in the eluate fractions is at least about 80%, or at least about 85%, or at least about 90%, or between about 90% and about 95%.

In some embodiments, the Mo-99 species may be eluted from the tridentate diglycolamide ligand by contact with an alkaline solution.

In some specific embodiments, the separation of molybdate and tungstate may be performed according to the following procedure: Prepare a sample solution comprising 1 mL of hot (radioactive) Mo-99 analytical sample (370 MBq Mo-99), tungsten-188 (spiking agent), carrier tungstate and hydrochloric acid; and, load the sample solution in a commercially available (Triskem) TODGA ion-exchange cartridge. The majority of the molybdenum-99 is retained on the resin. The (first 5 mL) eluted tungstate fraction with tungsten-187 is then accurately measured on the Gamma Spectrometer, without the interference of Mo-99. W-188 spiking serves as a recovery monitor.

Provided herein is a method for separating W-187 from Mo-99 by ion exchange chromatography. The following non-limiting examples are provided to further illustrate the present invention.

EXAMPLES

Example 1. Materials & Methods

Materials
TODGA 2.0 ml cartridges (TRISKEM)
Sodium tungstate dihydrate ($Na_2WO_4 2H_2O$) analytical grade (Merck)
Sodium molybdate dihydrate ($Na_2MoO_4 2H_2O$) analytical grade (Merck)
Hydrochloric acid (HCl, conc.) 37% (Baker)
Sulfuric acid ($H_2SO_4$, conc.) 96%, (Baker)
Nitric acid ($HNO_3$, conc.) 69-70% (Baker)
Sodium hydroxide pellets (NaOH, Merck)
Sodium hydroxide 1 M solution (Merck)
HEU Mo-99 analytical sample, 370 MBq/ml on CRT
LEU Mo-99 analytical sample, 370 MBq/ml on CRT
Methods
An ICP-AES used to evaluate and quantify the presence of Mo and W in the loading solution and eluents from the ion-exchange and precipitation experiments Several Ion-exchange chromatography tests were conducted, based on a mimic (nonradioactive) Mo-99 diluted analysis solution containing: 0.01 M sodium molybdate, 0.01 M sodium nitrate and 0.2 M sodium hydroxide. To this test solution, an alkaline (0.2 M NaOH) sodium tungstate solution in the concentration range of 0.01-0.001 M was added. After acidification, this solution is loaded onto an ion-exchange cartridge/column and eluted by applying vacuum (technevial). The molybdenum and tungsten concentration in loading solution, eluates and washings were measured by ICP-AES. Some experiments were carried out with Mo-99 spiked mimic solution and one with Mo-99 analytical solution. Then, the distribution of Mo-99 and technetium-99m was obtained by gamma-spectrometry.

Example 2. Chromatographic Separation of Mo-99 and W-187

Separation of Mo-99 and W-187 was carried out on a TODGA resin (triskem) 2 mL cartridge in 2.0 M HCl according to the following protocol. Eluate compositions were investigated by ICP elemental analysis.

1) In a glass vial, 1 mL was pipetted of a mimic molybdate sample solution (0.01 M $Na_2MoO_4$, 0.01 M $NaNO_3$ and 0.2 M NaOH).
2) 1 mL of tungstate carrier solution (0.01 M $Na_2WO_4$ in 0.2 M NaOH) was added to the vial from step 1.
3) The vial filled in steps 1 and 2 was heated and the residue resuspended in 2 mL of concentrated HCl.
4) The residue from step 3 was heated/evaporated. The residue was then resuspended into 5 ml of 2 M HCl.
5) A TODGA cartridge was preconditioned with 10 mL of 2 M HCl.
6) The solution from step 4 was transferred to a 10 mL syringe for column loading.
7) The solution was loaded on a 2 ml TODGA cartridge.
8) The first 5 mL was eluted into a technevial.
9) The syringe was refilled with 5 mL of 2 M HCl and elute in a second technevial
10) Step 9 was repeated 2 additional times.
11) 5 mL fractions were collected and the ICP results recorded for Mo and W concentration (ppm). The ICP-AES analysis results are shown in the following table:

| Solution Fraction | [Mo] (ppm) | [W] (ppm) |
|---|---|---|
| Loading Solution/TODGA/0 | 171 | 27.5 |
| Eluate 1/TODGA 0-5 mL | 0.173 | 19.2 |
| Eluate 2/TODGA 5-10 mL | 2.70 | 6.28 |
| Eluate 3/TODGA 10-15 mL | 5.19 | 1.72 |

Less than about 94% of W and about 1.7% of Mo were eluted in the first 2 fractions (0 to 10 mL), thereby achieving separation of W from Mo.

Example 3. Chromatographic Separation of Mo-99 and W-187

Separation of Mo-99 and W-187 was carried out on a TODGA resin (triskem) 2 mL cartridge in 2.5 M HCl according to the following protocol. Eluate compositions were investigated by ICP elemental analysis.

1) 2×5 mL loading solutions were prepared consisting of: 1 mL mimic molybdate solution (0.01 M $Na_2MoO_4$, 0.01 M $NaNO_3$ and 0.2 M NaOH), 1 mL tungstate solution (0.001 M $Na_2WO_4$ in 0.2 M NaOH) and 3 mL 2.52 M HCl.
2) A TODGA cartridge (2 mL) was preconditioned with 10 mL of 2.52 M HCl.
3) 5 mL of the loading solution from step 1 was eluted over the cartridge and collected into a technevial.
4) 5 mL fractions of 2.52 M HCl were eluted over the cartridge and collected, each fraction in its own technevial.
5) Step 4 was repeated 5 times
6) 5 mL fractions were collected and the ICP results were recorded for Mo and W concentration (ppm). The ICP-AES analysis results are shown in the following table:

| Solution Fraction | [Mo] (ppm) | [W] (ppm) |
|---|---|---|
| Loading Solution | 192 | 35.2 |
| Eluate 1 | 0.13 | 15.8 |
| Eluate 2 | 1.15 | 8.92 |
| Eluate 3 | 0.44 | <0.1 |
| Eluate 4 | 0.56 | <0.1 |
| Eluate 5 | 0.72 | <0.1 |
| Eluate 6 | 0.88 | <0.1 |
| Eluate 7 | 1.11 | <0.1 |

70% W was eluted in the first 2 fractions, and only 0.7% of Mo is found in these fractions. Accordingly, the above technique achieved separation of Mo from W.

Example 4. Chromatographic Separation of Mo-99 and W-187

The procedure of Example 3 was repeated twice. 5 mL fractions were collected and the ICP results recorded for Mo and W concentration (ppm). The ICP-AES analysis results are shown in the following table:

|  | Example 4A | | Example 4B | |
| --- | --- | --- | --- | --- |
| Solution Fraction | [Mo] (ppm) | [W] (ppm) | [Mo] (ppm) | [W] (ppm) |
| Loading Solution | 191 | 33.6 | 191 | 33.6 |
| Eluate 1 | <0.02 | 4.15 | 0.03 | 5.44 |
| Eluate 2 | 0.34 | 8.58 | 0.68 | 9.45 |
| Eluate 3 | 0.22 | <0.1 | 0.33 | <0.1 |
| Eluate 4 | 0.37 | <0.1 | 0.45 | <0.1 |
| Eluate 5 | 0.57 | <0.1 | 0.70 | <0.1 |

In the first two eluted fractions, 37.9% (Example 4A) and 44.3% (Example 4B) of W was eluted. Mo was retained for greater than about 99.8% (Example 4A) and greater than about 99.6% (Example 4B) in the first two fractions.

Example 5. Chromatographic Separation of Mo-99 and W-187

Separation of Mo-99 and W-187 was carried out in duplicate on two TODGA resin (triskem) 2 mL cartridges in 2.5 M HCl according to the following protocol. Eluate compositions were investigated by ICP elemental analysis.

1) 3×5 mL loading solutions were prepared consisting of: 1 mL of mimic molybdate solution (0.01 M $Na_2MoO_4$, 0.01 M $NaNO_3$ and 0.2 M NaOH), 1 mL of tungstate solution (0.001 M $Na_2WO_4$ in 0.2 M NaOH) and 3 mL of 2.52 M HCl.
2) Two TODGA cartridges (2 mL) were preconditioned with 10 mL of 2.52 M HCl.
3) 5 mL of loading solution is eluted over the cartridge and collected (technevial).
4) 5 mL fractions of 2.52 M HCl are put on the cartridge, eluted and collected, each fraction in its own technevial.
5) Step 4 is repeated 4 times.
6) 5 mL fractions were collected and the ICP results recorded for Mo and W concentration (ppm). The ICP-AES analysis results are shown in the following table:

|  | Example 5A | | Example 5B | |
| --- | --- | --- | --- | --- |
| Solution Fraction | [Mo] (ppm) | [W] (ppm) | [Mo] (ppm) | [W] (ppm) |
| Loading Solution | 187 | 36.7 | 187 | 36.7 |
| Eluate 1 | 4.91 | 24.7 | 1.18 | 26.1 |
| Eluate 2 | 4.04 | 7.19 | 2.39 | 6.92 |
| Eluate 3 | 1.80 | <0.1 | 0.90 | 0.11 |
| Eluate 4 | 2.27 | <0.1 | 1.14 | <0.1 |
| Eluate 5 | 2.52 | <0.1 | 1.55 | <0.1 |

In the first two eluted fractions, 86.90% (Example 5A) and 90% (Example 5B) of W is eluted. 4.8% (Example 5A) and 1.9% (Example 5B) of Mo was found in the first two fractions.

Example 6. Gamma Analysis of Eluate

The retention of Mo on the TODGA resin cartridge was tested by using 2.52 M HCl as the loading and eluting agent. The Mo is quantified by using hot Mo and cold W and gamma analysis of the eluate.

1) Behind a lead window, 1 mL of a Mo-99 molybdate bulk solution (between 200 and 370 MBq/mL) was pipetted into a glass vial.
2) 1 mL of tungstate solution (0.001 M $Na_2WO_4$ in 0.2 M NaOH) was added to the vial from step 1.
3) 3 mL of 2.52 M HCl was added to the vial from step 2.
4) 10 microliters of the solution from step 3) (loading solution) was diluted with 4990 microliters of 2.52 M HCl in a PE vial #10.
5) A TODGA cartridge (2 mL) was preconditioned with 10 mL of 2.52 M HCl.
6) The solution from step 4 was loaded onto the cartridge from step 5.
7) The solution eluted from the cartridge was collected into a 25 mL technevial at a rate of about 1 mL/minute.
8) 5 mL of 2.52 M HCl as added to the loading syringe and loaded onto the cartridge; the liquid eluted from the cartridge was collected in a 25 mL technevial.
9) Step 8 was repeated again three times
10) The dose rates and the gamma spectrum of the collected fractions were measured. See the following Table.

| Solution | Surface Dose rate (µS/hr) |
| --- | --- |
| Vial 0 (10 microliters loading solution) | 24 |
| Loading Solution | 1176 |
| Eluate 1 | 12 |
| Eluate 2 | 58 |
| Eluate 3 | 30 |
| Eluate 4 | 28 |

About 6% of the Mo-99 passed through the column in the first two fractions. From a radiological standpoint, there are no safety issues involved by handling the eluate fractions outside the lead shielding environment.

Example 7. Chromatographic Separation of Mo-99 and W-187

Separation of Mo-99 and W-187 was carried out on a TODGA resin (triskem) 2 mL cartridge in 3.0 M HCl according to the following protocol. Eluate compositions were investigated by ICP elemental analysis.

1) 2×5 mL loading solutions were prepared consisting of: 1 mL of mimic molybdate solution (0.01 M $Na_2MoO_4$, 0.01 M $NaNO_3$ and 0.2 M NaOH), 1 mL of tungstate solution (0.001 M $Na_2WO_4$ in 0.2 M NaOH) and 3 mL of 3 M HCl.
2) A TODGA cartridge (2 mL) was preconditioned with 10 mL of 3 M HCl.
3) 5 mL of the loading solution was eluted over the cartridge and collected in a technevial.
4) 5 mL fractions of 3.0 M HCl were put on the cartridge, eluted and collected, each fraction in its own technevial.
5) Step 4 was repeated 4 times.
6) 5 mL fractions were collected and the ICP results recorded for Mo and W concentration (ppm). The ICP-AES analysis results are shown in the following table:

| Solution Fraction | [Mo] (ppm) | [W] (ppm) |
|---|---|---|
| Loading Solution | 177.5 | 34.22 |
| Eluate 1 | <0.02 | 22.86 |
| Eluate 2 | <0.02 | 7.63 |
| Eluate 3 | <0.02 | <0.1 |
| Eluate 4 | <0.02 | <0.1 |
| Eluate 5 | <0.02 | <0.1 |

About 90% W was eluted in the first 2 fractions, and less than about 0.01% of Mo was found in these fractions. Accordingly, the above technique achieved separation of Mo from W.

Example 8. Chromatographic Separation of Mo-99 and W-187

The procedure of Example 7 was repeated twice. 5 mL fractions were collected and the ICP results recorded for Mo and W concentration (ppm). The ICP-AES analysis results are shown in the following table:

| | Example 8A | | Example 8B | |
|---|---|---|---|---|
| Solution Fraction | [Mo] (ppm) | [W] (ppm) | [Mo] (ppm) | [W] (ppm) |
| Loading Solution | 185 | 35.2 | 175.3 | 34.78 |
| Eluate 1 | <0.02 | 26.4 | <0.02 | 26.18 |
| Eluate 2 | 0.03 | 9.51 | <0.02 | 7.99 |
| Eluate 3 | <0.02 | <0.1 | <0.02 | <0.1 |
| Eluate 4 | <0.02 | <0.1 | <0.02 | <0.1 |
| Eluate 5 | <0.02 | <0.1 | <0.02 | <0.1 |

In the first two eluted fractions, about 102% (Example 8A) and greater than about 98% (Example 8B) of W was eluted. Less than about 0.01% of the Mo was found in these fractions. FIG. 1 is a graph demonstrating the separation of W and Mo when the eluting solution comprises 3 M of HCl. The data presented in FIG. 1 are aggregated from the separations of Examples 7 and 8.

Example 9. Chromatographic Separation of Mo-99 and W-187

Separation of Mo-99 and W-187 was carried out on a TODGA resin (triskem) 2 mL cartridge in 3.5 M HCl according to the following protocol. Eluate compositions were investigated by ICP elemental analysis.

1) 2×5 mL loading solutions were prepared consisting of: 1 mL of mimic molybdate solution (0.01 M $Na_2MoO_4$, 0.01 M $NaNO_3$ and 0.2 M NaOH), 1 mL of tungstate solution (0.001 M $Na_2WO_4$ in 0.2 M NaOH) and 3 mL of 3.5 M HCl.

2) A TODGA cartridge (2 mL) was preconditioned with 10 mL of 3.5 M HCl.

3) 5 mL of loading solution was eluted over the cartridge and collected in a technevial.

4) 5 mL fractions of 3.5 M HCl were put on the cartridge, eluted and collected, each fraction in its own technevial.

5) Step 4 was repeated 4 times.

6) 5 mL fractions were collected and the ICP results recorded for Mo and W concentration (ppm). The ICP-AES analysis results are shown in the following table:

| Solution Fraction | [Mo] (ppm) | [W] (ppm) |
|---|---|---|
| Loading Solution | 184.92 | 36.56 |
| Eluate 1 | <0.02 | 27.31 |
| Eluate 2 | <0.02 | 9.09 |
| Eluate 3 | <0.02 | 0.16 |
| Eluate 4 | <0.02 | <0.1 |
| Eluate 5 | <0.02 | <0.1 |

About 99.6% W was eluted in the first 2 fractions, and less than about 0.01% of Mo was found in these fractions. Accordingly, the above technique achieved separation of Mo from W.

Example 10. Chromatographic Separation of Mo-99 and W-187

The procedure of Example 9 was repeated twice. 5 mL fractions were collected and the ICP results recorded for Mo and W concentration (ppm). The ICP-AES analysis results are shown in the following table:

| | Example 10A | | Example 10B | |
|---|---|---|---|---|
| Solution Fraction | [Mo] (ppm) | [W] (ppm) | [Mo] (ppm) | [W] (ppm) |
| Loading Solution | 181.59 | 35.92 | 181.03 | 36.21 |
| Eluate 1 | <0.01 | 29.70 | <0.02 | 25.99 |
| Eluate 2 | <0.01 | 7.13 | <0.02 | 10.17 |
| Eluate 3 | <0.01 | 0.16 | <0.02 | 0.15 |
| Eluate 4 | <0.01 | <0.1 | <0.02 | <0.1 |
| Eluate 5 | <0.01 | <0.1 | 0.03 | <0.1 |

Figure 2:
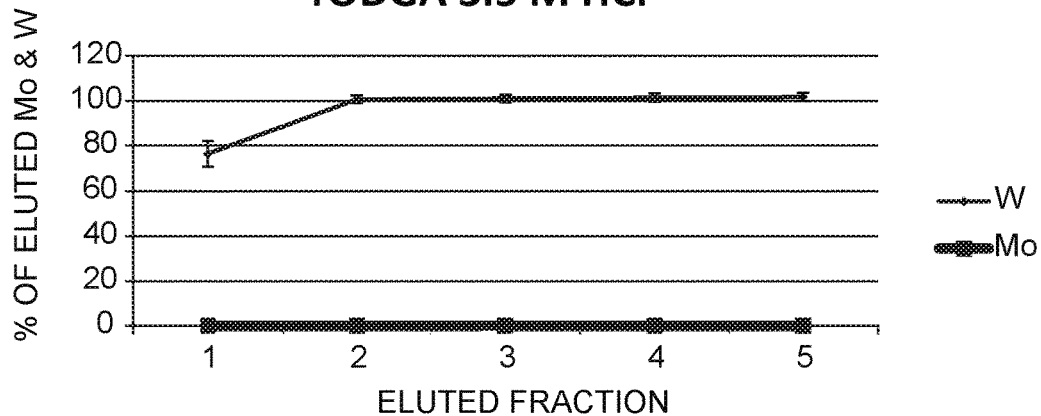
FIG. 2 is a graph demonstrating the separation of W and Mo according to some embodiments of the present invention. The eluting solution comprises 3.5 M HCl.

In the first two eluted fractions, 102.5% (Example 10A) and 99.9% (Example 10B) of W is eluted. Less than 0.01% of Mo is found in these fractions. FIG. 2 is a graph demonstrating the separation of W and Mo when the eluting solution comprises 3.5 M HCl. The data presented in FIG. 1 are aggregated from the separations of Examples 9 and 10.

Example 11. Chromatographic Separation of Mo-99 and W-187

Separation of Mo-99 and W-187 was carried out on a TODGA resin (triskem) 2 mL cartridge in 4.0 M HCl according to the following protocol. Eluate compositions were investigated by ICP elemental analysis.

1) 2×5 mL loading solutions were prepared consisting of: 1 mL of mimic molybdate solution (0.01 M $Na_2MoO_4$, 0.01 M $NaNO_3$ and 0.2 M NaOH), 1 mL of tungstate solution (0.001 M $Na_2WO_4$ in 0.2 M NaOH) and 3 mL of 4.0 M HCl.

2) A TODGA cartridge (2 mL) was preconditioned with 10 mL of 4.0 M HCl.

3) 5 mL of loading solution was eluted over the cartridge and collected in atechnevial.

4) 5 mL fractions of 4.0 M HCl were put on the cartridge, eluted and collected, each fraction in its own technevial.

5) Step 4 was repeated 4 times.

6) 5 mL fractions were collected and the ICP results recorded for Mo and W concentration (ppm). The ICP-AES analysis results are shown in the following table:

| Solution Fraction | [Mo] (ppm) | [W] (ppm) |
|---|---|---|
| Loading Solution | 184.84 | 36.34 |
| Eluate 1 | <0.02 | 26.98 |

-continued

| Solution Fraction | [Mo] (ppm) | [W] (ppm) |
|---|---|---|
| Eluate 2 | <0.02 | 9.20 |
| Eluate 3 | <0.02 | 0.60 |
| Eluate 4 | <0.02 | <0.1 |
| Eluate 5 | <0.02 | <0.1 |

About 99.6% W was eluted in the first 2 fractions, and less than about 0.01% of Mo is found in these fractions. Accordingly, the above technique achieved separation of Mo from W.

Example 12. Chromatographic Separation of Mo-99 and W-187

The procedure of Example 11 was repeated twice. 5 mL fractions were collected and the ICP results recorded for Mo and W concentration (ppm). The ICP-AES analysis results are shown in the following table:

| Solution Fraction | Example 12A | | Example 12B | |
|---|---|---|---|---|
| | [Mo] (ppm) | [W] (ppm) | [Mo] (ppm) | [W] (ppm) |
| Loading Solution | 183.71 | 36.20 | 181.76 | 35.87 |
| Eluate 1 | <0.02 | 26.75 | <0.02 | 25.53 |
| Eluate 2 | <0.02 | 9.02 | <0.02 | 8.45 |
| Eluate 3 | <0.02 | 0.62 | <0.02 | 0.70 |
| Eluate 4 | <0.02 | <0.1 | <0.01 | <0.01 |
| Eluate 5 | <0.02 | <0.1 | <0.01 | <0.01 |

Figure 3:
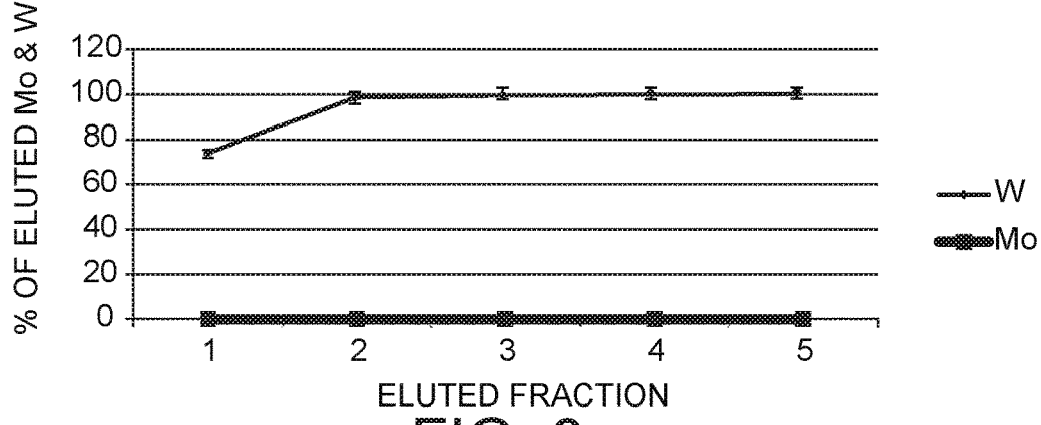
FIG. 3 is a graph demonstrating the separation of W and Mo according to some embodiments of the present invention. The eluting solution comprises 4 M HCl.

In the first two eluted fractions, 98.8% (Example 12A) and 94.7% (Example 12B) of W is eluted. Less than 0.01% of Mo is found in these fractions. FIG. 3 is a graph demonstrating the separation of W and Mo when the eluting solution comprises 4 M HCl. The data presented in FIG. 1 are aggregated from the separations of Examples 11 and 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of separating Mo-99 from W-187 from a solution comprising Mo-99 and W-187, the method comprising:

contacting a tridentate diglycolamide ligand with a solution comprising Mo-99 and W-187; and eluting the W-187 from the tridentate diglycolamide ligand to thereby yield an eluate comprising W-187.

2. The method of claim 1 wherein the tridentate diglycolamide ligand comprises N,N,N',N'-tetraoctyldiglycolamide.

3. The method of claim 1 wherein the Mo-99 is in a molybdate salt.

4. The method of claim 1 wherein the W-187 is in a tungstate salt.

5. The method of claim 1 wherein the tridentate diglycolamide ligand is contacted with the solution comprising Mo-99 and W-187 in a chromatography column.

6. The method of claim 1 wherein the tridentate diglycolamide ligand is contacted with the solution comprising Mo-99 and W-187 in a chromatography cartridge.

7. The method of claim 1 wherein the solution comprising Mo-99 and W-187 further comprises an acid.

8. The method of claim 1 wherein the solution comprising Mo-99 and W-187 further comprises an acid in a concentration of at least about 2.0 M.

9. The method of claim 1 wherein the solution comprising Mo-99 and W-187 further comprises an acid selected from the group consisting of hydrochloric acid, nitric acid, sulfuric acid, and any combination thereof.

10. The method of claim 1 wherein the solution comprises W-187/Mo-99 in an activity ratio of between about 500 kBq and about 18 KBq W-187 activity to about 370 MBq of Mo-99 activity.

11. The method of claim 1 wherein at least about 99% of Mo-99 is removed from the solution.

12. The method of claim 1 wherein the yield of W-187 is at least about 80%, or at least about 85%, or at least about 90%, or between about 90% and about 95%.

13. The method of claim 1 further comprising eluting the Mo-99 from the tridentate diglycolamide ligand by contact with an alkaline solution.

14. The method of claim 1 wherein the solution comprising Mo-99 and W-187 further comprises an acid in a concentration of at least about 2.5 M.

15. The method of claim 1 wherein the solution comprising Mo-99 and W-187 further comprises an acid in a concentration of at least about 3.0 M.

16. The method of claim 1 wherein the solution comprising Mo-99 and W-187 further comprises an acid in a concentration of at least about 3.5 M.

17. The method of claim 1 wherein at least about 99.5% of Mo-99 is removed from the solution.

18. The method of claim 1 wherein at least about 99.9% of Mo-99 is removed from the solution.

19. The method of claim 1 wherein at least about 99.99% of Mo-99 is removed from the solution.

* * * * *